United States Patent
Lawson et al.

(10) Patent No.: US 6,176,538 B1
(45) Date of Patent: Jan. 23, 2001

(54) DETACHABLE WINDSHIELD FOR MOTORCYCLES

(75) Inventors: Michael V. Lawson, Broken Arrow; Rodger W. Lay, Tulsa, both of OK (US)

(73) Assignee: Custom Windshields, Inc., Tulsa, OK (US)

( * ) Notice: Under 35 U.S.C. 154(b), the term of this patent shall be extended for 0 days.

(21) Appl. No.: 09/086,182

(22) Filed: May 28, 1998

(51) Int. Cl.$^7$ ..................................................... B62J 17/04
(52) U.S. Cl. ............................................................. 296/78.1
(58) Field of Search ......................... 296/78.1, 77.1, 296/79

(56) References Cited

U.S. PATENT DOCUMENTS

| | | | |
|---|---|---|---|
| 2,237,594 | * 4/1941 | Dunlap | 296/78.1 |
| 2,675,266 | 4/1954 | Comiskey, Sr. | 296/78.1 |
| 3,369,836 | 2/1968 | Hancock et al. | 296/78.1 |
| 3,866,242 | 2/1975 | Slagel | 2/2.5 |
| 4,082,345 | 4/1978 | Willey | 296/78.1 |
| 4,166,650 | 9/1979 | Saunders | 296/78.1 |
| 4,269,445 | 5/1981 | Gager, Jr. | 296/78.1 |
| 4,479,663 | 10/1984 | Morris et al. | 280/289 H |
| 4,488,750 | * 12/1984 | Gerber | 296/77.1 |
| 4,489,973 | 12/1984 | Willey | 296/78.1 |
| 4,615,556 | 10/1986 | Stahel | 296/78.1 |
| 4,632,448 | * 12/1986 | Yagasaki et al. | 296/218 |
| 4,696,509 | * 9/1987 | Yagasaki et al. | 296/84 A |
| 4,840,418 | * 6/1989 | Bockenheuser | 296/91 |
| 4,958,761 | * 9/1990 | Tenney | 224/316 |
| 5,419,604 | * 5/1995 | Clark | 296/97.9 |
| 5,604,633 | * 2/1997 | Christianson | 359/507 |
| 5,658,035 | 8/1997 | Armstrong | 296/78.1 |
| 5,758,889 | * 6/1998 | Ledakis | 280/47.38 |

* cited by examiner

Primary Examiner—Dennis H. Pedder
(74) Attorney, Agent, or Firm—Fellers, Snider, Blankenship, Bailey & Tippens, P.C.

(57) ABSTRACT

The present invention relates generally to a detachable windshield for use primarily on motorcycles. In particular, it pertains to a windshield that may be quickly installed and removed from its place on the motorcycle without tools, and which requires no hardware to be permanently or semi-permanently attached to the vehicle. It further pertains to piecewise planar windshields that have been stiffened and strengthen by placing one or more vertical creases therein. It also pertains to detachable motorcycle windshields that are optically distortionless or nearly so.

13 Claims, 2 Drawing Sheets

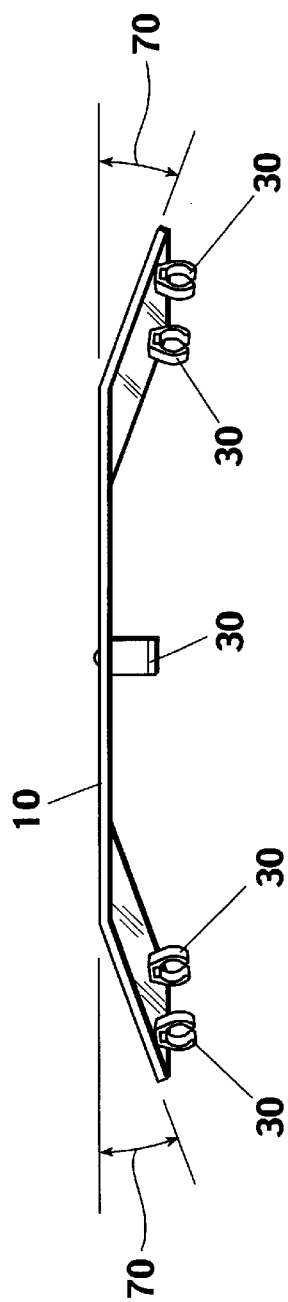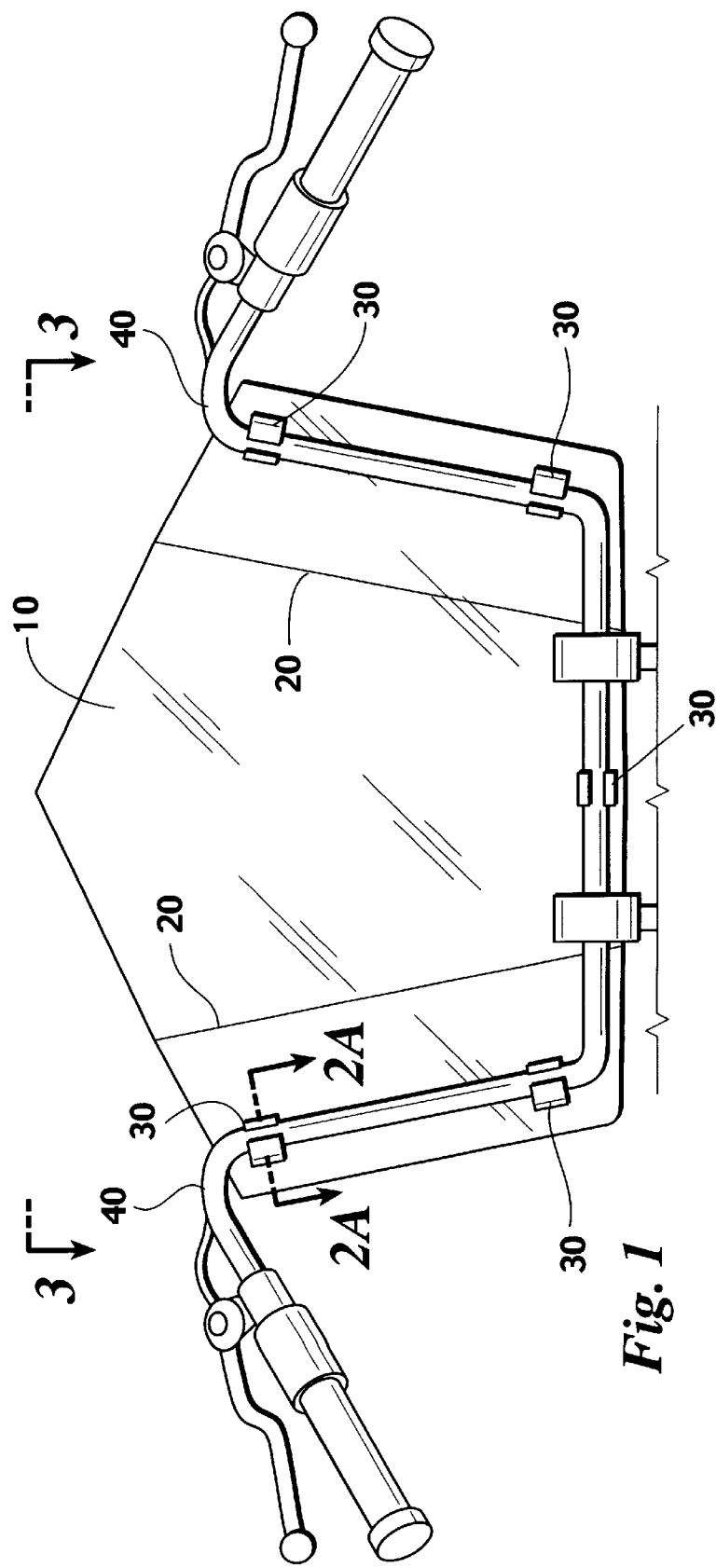

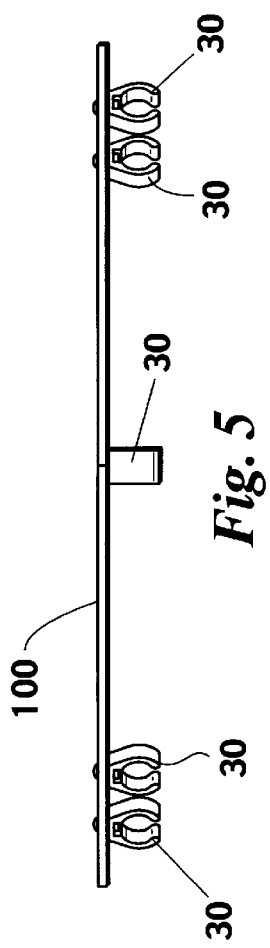
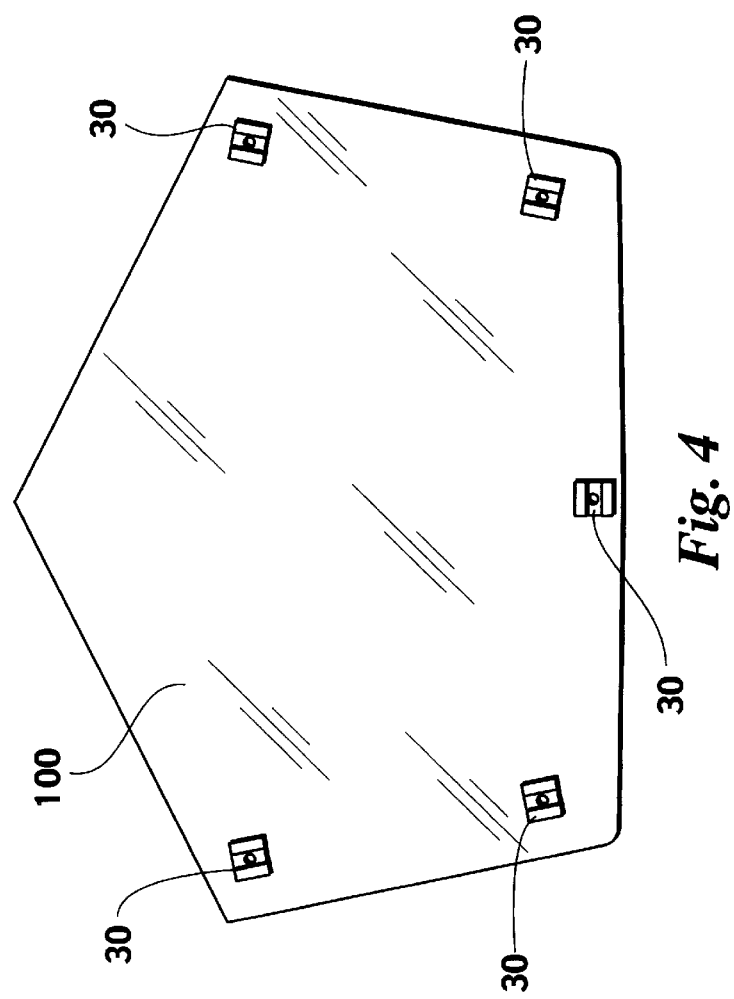
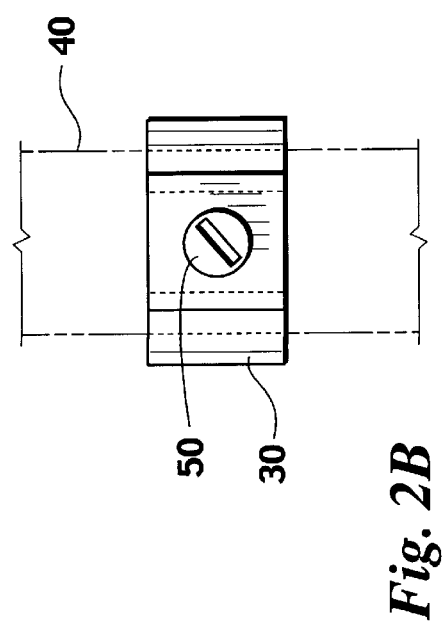
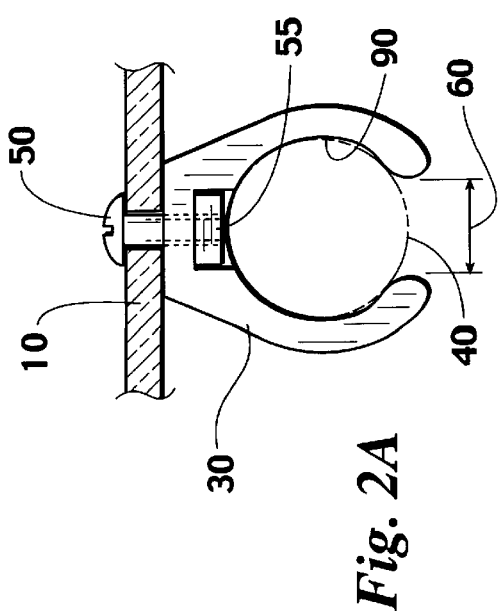

DETACHABLE WINDSHIELD FOR MOTORCYCLES

FIELD OF THE INVENTION

The present invention relates generally to a detachable windshield for use primarily on motorcycles. In more particular, it pertains to a windshield that may be quickly installed and removed from its place on the motorcycle and which requires no hardware that is permanently attached to the vehicle. It also pertains to windshields that are nearly "optically correct" in the sense that they introduce minimal optical distortion to objects viewed therethrough.

BACKGROUND

A motorcycle windshield, or windscreen as it is also called, is a piece of accessory equipment that may be found on many motorcycles, and occasionally on bicycles, a windshield being a generally transparent guard through which the motorcyclist looks to see the road ahead. Although they are otherwise usually fully equipped when sold, most motorcycles do not come from the factory with an installed windshield and, as such, windshields are a popular after-sale accessory purchase.

Motorcycle windshields are generally mounted either on the frame or on the handlebars (the later being alternatively called "fork mounted") of the vehicle out in front of the rider. A properly designed windshield deflects at least a portion of the onrushing force of the wind over and around the rider and may additionally act to intercept and deflect small debris such as sand, pebbles, and bugs away from the rider, even small debris such as these becoming painful projectiles at highway speeds.

Broadly speaking, motorcycle windshields are of two sorts: removable and permanent. A removable windshield is one that is designed to be taken off of the vehicle and reinstalled as needed, whereas a "permanent" windshield is expected to remain installed indefinitely. In some sense, of course, all windshields are removable eventually, but the preferred removable windshield for purposes of this application is one that can be easily attached and detached from the vehicle, preferably without tools.

Many motorcyclists prefer to use windshields when making longer trips at highway speeds, but find them unnecessary—or even an annoyance—for short trips around town. This sort of rider appreciates a windshield that can be removed from the motorcycle and reinstalled as needed. However, a typical mounting arrangement for a removable windshield may require wrench tightening of at least two bolts, a fact that brings about a certain reluctance to install or remove it. Additionally, when the rider is away from home, it may be necessary to carry the tools to temporarily remove the device for local travel at a remote destination. Thus, the preferred windshield for use in this sort of situation is one that can be completely removed and reinstalled again without tools.

Additionally, other things being equal, most owners would prefer a removable motorcycle windshield that can be installed without making a permanent modification to the vehicle. In particular, some removable windshields require the installer to drill one or more holes into the frame or handlebars of the vehicle so that mounting hardware may be installed. Many riders—and especially those that drive classic or collector motorcycles—might desire to add a windshield to his or her bike, but would not do so because of the decrease in value that such permanent modifications might bring.

Further, even when the windshield does not require permanent modification to the vehicle as part of its installation, it is often the case that an otherwise easily-removed windshield will still requires some semi-permanent mounting fixtures to be attached to the vehicle, semi-permanent meaning for purposes of this application a fixture that cannot be removed without tools. In these cases it may be relatively easy to remove the shield itself, but residual mounting hardware remains attached to the vehicle thereafter. This is not only unsightly, but can make it difficult to thoroughly clean the vehicle, as road dirt inevitably accumulates around the mounting hardware.

Safety should always be a concern with motorcycle equipment and, in fact, a windshield does generally increase the safety of the rider by intercepting some small projectiles that might otherwise strike him or her. However, the use of a windshield—either permanent or removable—raises the possibility of injuries to the rider of another sort, and the preferred windshield is one that is designed to minimize this risk. In particular, when a motorcyclist is involved in an accident, it is not uncommon for the rider to be thrown forward over the front of the vehicle. In that case, the rider may impact against the windshield, thereby injuring himself or herself more than he or she might otherwise. A windshield must be solidly mounted on the motorcycle so as to resist the force of the wind and road projectiles. On the other hand, a windshield that does not "give" when a rider is thrown against it from behind can cause serious injury over and above those injuries that the rider might otherwise experience. Thus, the ideal windshield, whether removable or permanent, is one that resists blows and forces coming from the front of the vehicle and yields to blows coming from the rear of the vehicle, thereby reducing the risk of injury to the rider in certain kinds of accidents.

Another safety concern related to motorcycle windshields is that they are sometimes made of cast acrylic materials, a relatively brittle material that can shatter into jagged pieces when stressed. As might be expected, these jagged edges can pose a safety hazard to the motorcyclist in some situations. An advantage of using cast acrylic materials is that they can be easily and cost-effectively molded into almost any conceivable shape by techniques such as hot forming or vacuum forming. However, this advantage comes at the expense of an increased risk of injury to the rider.

Finally, although it is often taken for granted that a windshield should be optically transparent (or nearly so) so that the road ahead can be clearly perceived, it is quite common—in fact it is virtually the rule—that the manufacturing process introduces mild to severe optical distortions into a modern motorcycle windshield. By way of example, consider the windshield illustrated in Willey, U.S. Pat. No. 4,489,973. This windshield is typical in that it has been formed into a contoured shape, with the various contours being arranged so as to avoid, among other things, the instruments and handlebar mounts. Additionally, contouring of the windshield shape can also be used to improve its aerodynamics. However, radially molded designs such as the one illustrated in Willey, although they might be cost effective to manufacture, inevitably distort, at least somewhat, images viewed therethrough. In particular, a curved section of a windshield tends to act like a lens, causing parallel "rays" of light to either converge (concave section) or diverge (convex section). In either case, this bending of light rays results in perceived distortion to objects seen through the windshield. Further, since the head and eyes of motorcycle rider are in near constant motion (due to road irregularities, if nothing else), objects in the road ahead will be viewed at different times through different sections of the windshield (each potentially having its own radius of curvature), which creates the possibility for eyestrain and inaccurate perception. On the other hand, a planar windshield contains no such variational sources of distortion and, to the extent that the materials it is made from are optically distortionless, it will offer relatively distortionless viewing.

In the past the motorcyclist has been faced with a dilemma: he or she must either choose a windshield that is easy to attach and detach but that requires some sort of permanent hardware mount to be affixed to the vehicle, or a windshield that does not require a permanent attachment to the vehicle but is more difficult to remove. For example, Armstrong U.S. Pat. No. 5,658,035 discloses a windshield that is easy to remove, as it requires little more than slipping the device onto preinstalled bushings. However, the bushings are installed by drilling holes into the motorcycle frame, a practice that permanently defaces the vehicle. On the other hand, inventors such as Comiskey, Sr., U.S. Pat. No. 2,675, 266, and Gager, Jr., U.S. Pat. No. 4,269,445, teach windshields that do not require a permanent modification to the vehicle, but which cannot be completely removed without some effort and / or tools.

Similarly, many of the prior art windshields are molded into contoured shapes (e.g., Comiskey Sr., U.S. Pat. No. 2,675,266, and Saunders, U.S. Pat. No. 4,166,650), so the prospective windshield purchaser has often had little choice but to purchase a windshield that distorts at least a portion of his or her field of vision.

Thus, what is needed is a removable motorcycle windshield that can be completely installed onto and removed from the vehicle without tools. Additionally, this windshield should require no permanent or semi-permanent mounting hardware to be attached to the vehicle. Further, the windshield should be as optically distortionless as possible and made of a material that will not shatter upon impact. Finally, the windshield should be resistant to solid blows from the front but designed to separate easily and completely from the vehicle when struck from behind, thereby tending to protect the rider in the event of an accident.

Before proceeding to a description of the instant invention, however, it should be noted and remembered that the description of the invention which follows, together with the accompanying drawings, should not be construed as limiting the invention to the examples (or preferred embodiments) shown and described. This is so because those skilled in the art to which the invention pertains will be able to devise other forms of this invention within the ambit of the appended claims.

SUMMARY OF THE INVENTION

The invention disclosed herein pertains generally to detachable motorcycle windshields that do not require the use of permanently attached mounting hardware. It additionally pertains to motorcycle windshields that can be easily and completely removed without tools. It also pertains to windshields that are resistive to blows originating in front of the vehicle but which readily detach from the vehicle when struck from behind. Finally, it pertains to windshields that are optically correct and minimally distort images viewed therethrough.

According to a first aspect of the present invention there is provided a motorcycle windshield that can be completely installed and detached without the use of hand tools. In the preferred embodiment, the windshield will be formed in the general shape of a pentagon, although other shapes are certainly possible. The windshield is made of a suitable transparent material—preferably a thermoplastic such as a polycarbonate—and is attached to the handlebars of a motorcycle by a plurality of "c-clips" (or quick clips, as they are also known), which c-clips are positioned on the rear face of the windshield according to the particular handlebar configuration of the vehicle. By placing the c-clips on the rearward face of the windshield, a mounting arrangement is created which is resistant to the force of the wind on its front face but which readily separates from the vehicle when struck from the rear. Additionally, a windshield mounted in this manner is easily removed by the owner without tools and does not require any sort of permanent mounting hardware to be affixed to the vehicle.

According to a second aspect of the present invention, there is provided a motorcycle windshield which is piecewise planar and has at least one vertical bend or reinforcing crease placed therein, said crease extending from the base of the windshield to its top. The inclusion of one or more, but preferably two, such reinforcing creases increases the rigidity of the windshield while leaving the windshield otherwise transparent. Thus, a windshield formed in this manner from a generally flat sheet of transparent material is almost completely transparent, except perhaps for a linear region along the fold axis or axes of the crease. Additionally, these creases allow the windshield to be shaped to fit different motorcycles and improve the aerodynamic properties of the device against the force of the wind.

The foregoing has outlined in broad terms the more important features of the invention disclosed herein so that the detailed description that follows may be more clearly understood, and so that the contribution of the instant inventor to the art may be better appreciated. The instant invention is not to be limited in its application to the details of the construction and to the arrangements of the components set forth in the following description or illustrated in the drawings. Rather, the invention is capable of other embodiments and of being practiced and carried out in various other ways not specifically enumerated herein. Finally, it should be understood that the phraseology and terminology employed herein are for the purpose of description and should not be regarded as limiting, unless the specification specifically so limits the invention.

BRIEF DESCRIPTION OF THE DRAWINGS

FIG. 1 is a view of one embodiment of the instant invention as seen from the rear of the vehicle, wherein one or more reinforcing creases have been placed in the windshield.

FIG. 2 contains detailed views of the preferred fastener for use with the instant invention.

FIG. 3 is a top view of the embodiment in FIG. 1, wherein the reinforcing bends in the windshield are more fully illustrated.

FIG. 4 contains a view of a preferred embodiment of the instant invention, wherein a windshield is provided that is removably mounted and optically superior.

FIG. 5 is a top view of the embodiment of FIG. 4.

DETAILED DESCRIPTION OF THE PREFERRED EMBODIMENTS

Referring to the drawings in detail, wherein like numerals denote identical elements throughout the several views, there is shown in FIG. 4 a preferred embodiment of the instant invention as it would appear when viewed from the rear of the motorcycle. Removable motorcycle windshield 100 is constructed so as to be both resistant to blows on its front surface and easily separable from the vehicle when struck from behind. Additionally, this embodiment may be installed and completely removed without the use of hand tools. In the embodiment of FIG. 4, the windshield 100 is preferably formed in the shape of a planar pentagon, although those skilled in the art will recognize that many other shapes are possible, and, in fact, this possibility has been specifically contemplated by the instant inventors.

Attached to the windshield 100 on the side nearest the motorcycle rider (the "rear" face, hereinafter) are a plurality of "c-clips" 30, whereby the windshield 100 may be removably mounted on the handlebars 40. As illustrated in FIG. 2A, the c-clips 30 are so-called because in profile they resemble the letter "C," with the gap between the ends of the two arms of the "C" defining aperture 60. The space enclosed by the two arms is central aperture 90. By way of example, HEYCO mount part number 1029 is one type of c-clip that would be suitable for use in the instant invention. A c-clip 30 is preferably made of plastic or some other flexible material that imparts elasticity to the arms of the c-clip 30 so that these arms return to their original positions after being moved by small amounts of stress.

This property is important for purposes of the instant invention because it provides a means of installing a windshield 100 onto a motorcycle without using tools or permanent hardware mounts. In more particular, when the aperture 60 of a c-clip 30 is pressed against a cylindrical object that is sized slightly smaller than its central aperture 90, the arms of the c-clip 30 tend to move apart, thereby allowing the cylindrical object to pass between them and into the central aperture 90. The two arms of the c-clip 30 thereafter firmly close about or clasp the cylindrical object, thereby trapping it within the central aperture 90. Needless to say, the cylindrical object of most interest for purposes of the instant invention is a motorcycle handle bar 40, a riser, or any other part of the steering section.

Thus, a windshield 100 that is equipped with a sufficient number of properly positioned c-clips 30 on its rear face may be installed by placing the apertures 60 of the c-clips 30 against the handlebars 40 and thereafter applying pressure against the windshield 100 in the direction of the rear of the vehicle. The pressure that is applied to the front face of the windshield 100 is transmitted through the windshield 100 to the c-clips 30, the arms of which c-clips 30 then tend to spread apart, thereby providing access by the motorcycle handlebars 40 to the c-clip central apertures 90 at a plurality of points.

C-clips 30 are preferably attached to the windshield 100 by way of a nut 55 and bolt 50 combination (FIGS. 2A and 2B), which bolt 50 passes through the windshield 100 and into a pre-drilled hole in c-clip 30. Nut 55 mates with the threaded end of bolt 50 and secures the c-clip 30 to the rear surface of the windshield 100 with the arms of the clip 30 pointing away from the rear surface of windshield 100. Those skilled in the art will recognize that the c-clips 30 should be sized in such a way as to accommodate a motorcycle handlebar 40 or frame member therein. Additionally, the instant inventors contemplate that in some situations, it might be necessary to vary the size of the clips 30 depending on their position on the windshield 100 and the various motorcycle parts to which they must be attached. The position and number of the c-clips 30 can be varied as needed to fit the windshield 100 to a variety of different handlebar 40 configurations. Although the instant invention has been illustrated only with respect to upright handlebars 40, it should be clear to those skilled in the art that by relocating the positions of the c-clips 30, it is also possible to fit the windshield 100 to a motorcycle with down turned or straight handlebars 40.

The number, position, and size of the c-clips 30 are determined by the configuration of the handlebars 40 and fork of the motorcycle to which the windshield 100 is to be attached. More particularly, the c-clips 30 are positioned on the windshield 100 in sufficient quantity so as to provide a firm connection with the motorcycle. It will be understood by those skilled in the art that it is necessary that the c-clips 30 be properly positioned on the windshield 100 to match the hardware of the particular motorcycle on which it is to be installed. However, methods for doing this are well known to those skilled in the art and will not be discussed herein.

Due to the nature and configuration of the preferred mounting clips 30, it is critical that the windshield 100 be mounted on the forward side of handlebars 40; that is, on the opposite side of the handlebars 40 from the motorcyclist. The handlebars 40 then provide support for the windshield 100 against blows on its forward face and from the onrushing force of the wind at highway speeds. Additionally, because of the configuration of the c-clips 30 and the mounting of the windshield on the front of the handlebars 40, the windshield 100 will easily separate from the vehicle when struck from behind, thereby reducing the risk of injury to the rider.

Removal of the windshield 100 may be accomplished by applying pressure against its rear face. The arms of the c-clips 30 will then spread apart and release the motorcycle members held within the central apertures 90, thereby freeing the windshield 100 from the motorcycle.

For purposes of the instant embodiment, it is preferred that the windshield 100 be a planar surface, but that is not an absolute necessity. The windshield 100 is preferably formed from a generally flat sheet of transparent polycarbonate material such as that which is marketed under the "LEXAN" or "SHEFFIELD" trademarks. As is well known to those skilled in the art, a polycarbonate is a thermoplastic characterized by a high-impact strength and is often used to make unbreakable windows. It should be of sufficient thickness to withstand the force of the wind and the force of at least small road projectiles and, in the preferred embodiment, the windshield 100 should be at least ⅛-inch thick. Substitution of a curved or contoured windshield 100 for the preferred planar configuration is certainly possible and has been contemplated by the inventors. Doing so, however, would result in a windshield 100 that has more optical distortion than would be normally desired.

According to a second aspect of the instant invention, and as is illustrated in FIG. 1, there is provided a windshield 10 that is piecewise planar and is formed from a single piece of flat material wherein one or more bends or reinforcing creases 20 have been placed. These reinforcing creases 20 have three principle functions. First, they act to stiffen and reinforce the windshield 10 against forces impinging against its front face. Second, the creases 20 allow the windshield 10 to be customized so as to fit more closely to a particular motorcycle handlebars 40 or frame. Finally, by varying the placement of the creases 20 and their bend angles 70 (FIG. 3), it possible to improve the aerodynamic properties of the windshield 10.

The precise bend angles 70 and the location and number of the reinforcing creases 20 are preferably empirically determined on a trial-and-error basis for a particular handlebar 40 configuration. A bend angle 70 represents the angle between any two adjacent planar faces, the two planar faces being defined by—and separated by—a reinforcing crease 20. That being said, as illustrated in FIGS. 1 and 3, the preferred number of reinforcing creases 20 is two, and the preferred bend angles 70 are both equal to 20°. Thus, the windshield 10 consists of three piecewise planar sections: a central section, an adjacent left section (separated from the central section by a left reinforcing crease), and a right section (adjacent to the central section and separated from it by a right reinforcing crease).

It is crucial for purposes of the instant embodiment that the windshield 10 be formed from a single planar piece of material which has been bent or creased. In more particular, in the preferred embodiment the windshield will be made of a sheet of clear material, such as polycarbonate, which is about ³⁄₁₆-inch thick. Note that the term "clear" as used herein is intended to also include tinted windshields.

The preferred method of forming such a windshield 10 is to obtain a sheet of a polycarbonate material and cut it to the proper shape, e.g. into a pentagon. Next, the now-cut polycarbonate sheet is bent as required (cold formed) to create the requisite number of reinforcing creases, preferably using a device such as a press brake, as that term is known to those skilled in the art. Since polycarbonate is a relatively malleable material, it can be bent without breaking and, further, it will hold the crease 20 indefinitely. Note that, generally speaking, acrylic materials are too brittle for this sort of treatment, and they would have to be cast or otherwise formed into a piecewise planar windshield 10 such as that taught herein. That being said, although a windshield made from a polycarbonate material is the preferred choice, any number of other suitable materials might be used instead.

The great advantage, vision wise, of constructing a windshield in this fashion is that the resulting windshield 10 is composed of a series of connected planar segments which, except for the region in the immediate vicinity of the reinforcing creases 20, remain optically clear. Said another way, the separate planar regions of the windshield 10 remain optically clear after the windshield 10 has been creased. Since the reinforcing creases 20 occupy only a small portion of the rider's optical field, the road ahead as viewed through the windshield 10 remains as free from distortion as it is possible for a flat piece of polycarbonate to be. Since there are no curved surfaces in this windshield 10 (except, of course, for the reinforcing creases 20 themselves), this windshield 10 neatly circumvents the distortion problem that has consistently plagued windshields in the prior art.

Although FIG. 1 indicates that the windshield 10 of the instant invention is mounted to the motorcycle using c-clips 30—and that is the preferred method of doing so—there are, in fact, any number of means and arrangements for mounting the device on a motorcycle. By way of example, it could be mounted directly on a fiberglass faring rather than on the handlebars or frame. The specific means used to mount the device might be any conventional mounting hardware including electric conduit clamps, releasable (or not) plastic cable ties, VELCRO, automotive clips and clamps used on hood braces, trim pieces and wire loom routing clips, push mount wire clips, plastic or metal cable clamps, or small individual mounting bases (metal or plastic) which mount to the handle bars using a pin or other quick fastening device, to name but a very few examples.

While the inventive device has been described and illustrated herein by reference to certain preferred embodiments in relation to the drawings attached hereto, various changes and further modifications, apart from those shown or suggested herein, may be made therein by those skilled in the art, without departing from the spirit of the inventive concept, the scope of which is to be determined by the following claims.

What is claimed is:

1. A windshield for use on a motorcycle, said windshield acting to protect an operator of said motorcycle when said motorcycle is in motion, said motorcycle having a forward end and a rearward end, said windshield being mounted proximate to said forward end of said motorcycle, comprising:

(a) a piecewise planar sheet of transparent material, said piecewise planer sheet of transparent material containing at least one reinforcing crease therein, wherein said piecewise planar sheet of transparent materials has a front face and a rear face, said rear face of said piecewise planar sheet being oriented to face toward said rearward end of said motorcycle when it is mounted thereon; and (b) a plurality of c-clips attached to said rear face of said piecewise planar sheet of transparent material, said c-clips for attaching said sheet of transparent materials to said motorcycle.

2. A windshield according to claim 1 wherein there are exactly two reinforcing creases.

3. A windshield according to claim 2 wherein said piecewise planer sheet of transparent material consists of a left planar section, a central planar section, and a right planar section, said left and said central planar sections being separated by a left reinforcing crease, and said right and said central planar sections being separated by a right reinforcing crease.

4. A windshield according to claim 3 wherein said left planar section and said central planar section meet at an angle of about 20° and wherein said right planar section and said central planar section meet at an angle of about 20°.

5. A removable windshield for use on a motorcycle having a steering section and a rearward end, comprising:

(a) a sheet of transparent material having a front face and a rear face, said rear face of said sheet of transparent material facing said rearward end of the motorcycle when said sheet of transparent materials is attached thereto; and, (b) a plurality of c-ciips attached to said rear face of said sheet of transparent material, said c-clips for attaching said sheet of transparent materials to said motorcycle steering section.

6. A removable windshield for use on a motorcycle having handlebars and a front fork, said windshield acting to protect an operator of said motorcycle when said motorcycle is in motion, said motorcycle having a forward end and a rearward end, said windshield being mounted proximate to said forward end of said motorcycle, comprising:

(a) a piecewise planar sheet of transparent material containing at least one reinforcing crease therein, said piecewise planar sheet of transparent materials having a front face and a rear face, said rear face of said piecewise planer sheet of transparent material being oriented to face toward said rearward end of said motorcycle when it is mounted thereon; and, (b) a plurality of c-clips affixed to said rear face of said piecewise planar sheet of transparent material, said c-clips for mounting said sheet of transparent material on said motorcycle handlebars and front fork.

7. A removable windshield according to claim 5 wherein said sheet of transparent material is a planar sheet of transparent material.

8. A removable windshield according to claim 7 wherein said sheet of transparent material is a piecewise planar sheet of transparent material.

9. A windshield according to claim 8 wherein said piecewise planar sheet of transparent material consists of a left planar section, a central planar section, and a right planar section, said left and said central planar sections being separated by a left reinforcing crease, and said right and said central planar sections being separated by a right reinforcing crease.

10. A windshield according to claim 9 wherein said left planar section and said central planar section meet at an angle of about 20° and wherein said right planar section and said central planar section meet at an angle of about 20°.

11. A windshield according to claim 6 wherein there are exactly two reinforcing creases.

12. A windshield according to claim 11 wherein said piecewise planer sheet of transparent material consists of a left planar section, a central planar section, and a right planar section, said left and said central planar sections being separated by a left reinforcing crease, and said right and said central planar sections being separated by a right reinforcing crease.

13. A windshield according to claim 12 wherein said left planar section and said central planar section meet at an angle of about 20° and wherein said right planar section and said central planar section meet at an angle of about 20°.

* * * * *